United States Patent
Short et al.

(10) Patent No.: US 6,377,364 B1
(45) Date of Patent: Apr. 23, 2002

(54) SCANNER BELT TENSIONING SYSTEM

(75) Inventors: D. Bradley Short, San Diego; Michael Scott Gray, Encinitas, both of CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/283,794

(22) Filed: Apr. 1, 1999

(51) Int. Cl.[7] .................................................. H04N 1/04
(52) U.S. Cl. ...................................... 358/474; 358/497
(58) Field of Search ................................. 358/474, 494, 358/497; 250/234

(56) References Cited

U.S. PATENT DOCUMENTS 6,234,931 B1 * 5/2001 Kanekura .................... 475/149
6,311,973 B1 * 11/2001 Tanaka et al. .............. 371/314

* cited by examiner

*Primary Examiner*—Kimberly A. Williams

(57) ABSTRACT

A document scanner carriage drive belt tensioner includes a pivotally mounted base with integrally formed retainers on the base and scanner housing for holding the base in one of three positions comprising a tensioner spring removal position, a carriage belt installation position and an operative or carriage belt tensioning position, all without the necessity of disconnection of any tensioner fasteners. The tensioner is therefore easily operable by an unskilled user to replace the tensioner spring or scanner carriage drive belt when necessary.

11 Claims, 4 Drawing Sheets

SCANNER BELT TENSIONING SYSTEM

CROSS REFERENCE TO RELATED APPLICATIONS, IF ANY

None.

BACKGROUND OF THE INVENTION AND PRIOR ART

As is conventional, document scanners usually have a generally rectangular housing with an upper window on which a document to be scanned is placed. The housing contains a scanner carriage mounted on one or more longitudinally extending support rods or guides. The carriage is moved back and forth along the support rods by a motor driven flexible belt. Although the drive belt is slightly elastic, wear and fatigue of the belt and product dimensional variations from plastic creep phenomena and/or manufacturing tolerances gradually results in variation of the belt tension over time with resultant slippage. Accordingly, a belt tensioner mechanism is desired which is suitable for use in a document scanner so that the belt can be easily replaced when necessary by unskilled users and used to maintain proper tension throughout product life.

Various forms of belt tensioning mechanisms are well known and these generally comprise a belt tensioning pulley which is moveable from a belt installation position to a belt tensioning position in which the tensioning pulley applies the desired degree of tension to the belt under the influence of a tensioner spring. To date, belt removal or installation is difficult since the belt is easily manipulated within the close confines of a document scanner housing and screws or other fasteners should be avoided since they are easily dropped into the scanner housing to locations from which they are difficult to retrieve. Current belt tensioning systems also do not limit the travel of the belt tensioning device to protect the scanner module from catastrophic damage due to a mechanical shock induced by either customer usage or during rough handling while shipping. For purposes of the mechanical shock environment, current scanner housings utilize an additional part to function as a locking device during shipping that the customer must manually remove before using the product, leaving the scanner unprotected from mechanical shocks that can occur during customer usage or transportation. For this reason and for reasons of economy, belt tensioners have not hereto been adequate in the user handling and shipping environment. The use of a tensioner enables use of a non-stretchable belt if desired, a reduced spring tensioning force that can be utilized in a purely plastic housing structure without compromising housing integrity, and does not require a separate scanner locking device.

SUMMARY OF THE INVENTION

The present invention provides, in a document scanner which includes a housing and a belt driven moveable document scanning carriage in said housing, a belt tensioner comprising:

a) a tensioner base attached to said scanner housing for movement about a first pivot axis, said base being moveable in a plane substantially parallel to the direction of movement of said carriage;

b) a belt tensioner pulley mounted on said base for rotation about a second axis parallel to and spaced from said first axis, said pulley being engageable with a carriage drive belt; and c) a spring affixed to said base and to said housing for biasing said base in a direction to tension said belt; said base and said housing having first engageable means for retaning said base relative to said housing in a belt installation position and second engageable means for retaining and limiting movement of said base relative to said housing in a belt tensioning position, said base being moveable with respect to said housing along said first axis to disengage said first and second engageable means to permit pivotal movement of said base relative to said housing between said positions and to a spring removal position.

DESCRIPTION OF THE PREFERRED EMBODIMENT

Figure 1:
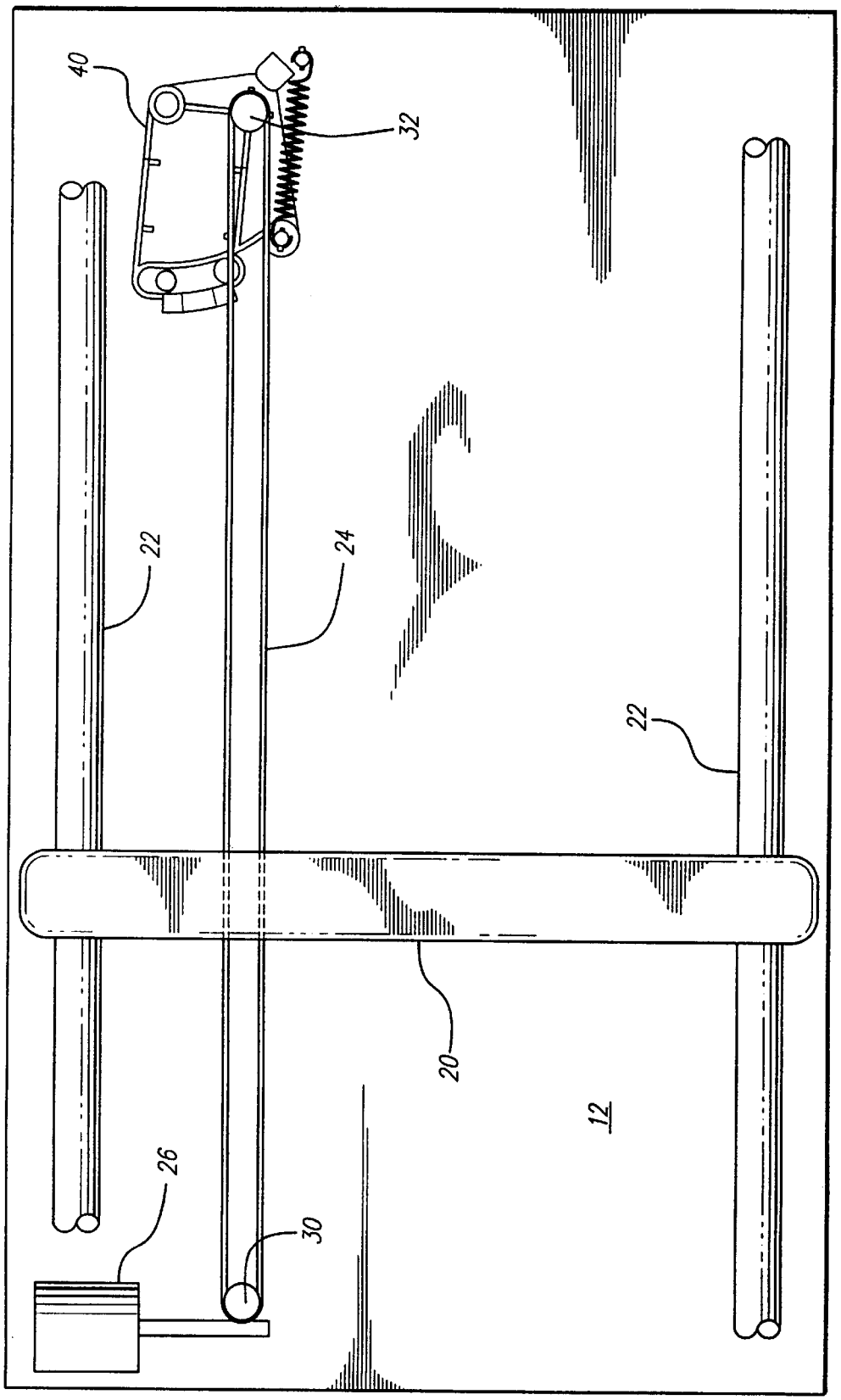
FIG. 1 is a plan view of a document scanner having a belt driven carriage and a belt tensioner.

As seen in the plan view of FIG. 1 a document scanner 10 includes a housing 12 of generally rectangular configuration in which the moveable scanner carriage 20 is mounted on transversely extending support rods or guides 22. The carriage 20 is moved by a drive belt 24 connected to a drive motor 26, the belt being trained around pulleys 30, 32 at either end of the path of travel of the scanner carriage.

The belt tensioner 40 of the present invention is generally positioned in the location shown in FIG. 1 and, in the enlarged plan view of FIG. 2 which shows the tensioner in the belt installation position, the tensioner comprises a base 42 which is pivotally mounted with respect to the bottom of the scanner housing 12 for movement in a plane below and parallel to the plane of movement of the scanner carriage 20. The tensioner base 42 is pivotally supported on a vertically extending pivot shaft 44 which may be integrally formed on the bottom of the scanner housing 12. The shaft 44 is received in a cylindrical pivot bearing 45 formed in the base 42 such that the base 42 is permitted to pivotally move between three positions including the belt installation position seen in FIG. 2; a belt tensioning or operative position as seen in FIG. 3; and a tensioner spring removal position as shown in the exploded view in FIG. 4.

The tensioner base 42 also includes a belt installation aperture 50 and a belt tensioning/travel limiting aperture 52 each spaced on an arc centered on the pivot shaft 44. A tension spring 56 is affixed at one end to a spring mounting post 58 on the base 42 and at the other end to a spring mounting post 60 which may be integrally formed with the scanner housing 12 to impart a counterclockwise bias (as seen in FIG. 2) to the tensioner base 42. A belt tensioner pulley 32 is mounted on the base 42 for free rotation relative to the base about a vertically extending pulley shaft 33 affixed to the base 42. Preferably, the scanner drive belt 24 and tensioner pulley 32 each have mating teeth 25, 37 to prevent slippage of the belt relative to the pulley.

A tensioner positioning post 64 vertically extends from the scanner housing 12 and is receivable in either the belt installation aperture 50 or in the belt tensioning aperture 52. It will be noted that the belt tensioning aperture 52 is elongated in the direction of an arc centered on the pivot shaft 44. Elongation of the belt tensioning aperture 52 relative to the diameter of the positioning post 64 permits the tensioning spring 56 to flex slightly during scanner housing dimensional variations such as, but not limited to, dimensional instability that occurs from fluctuations in scanner housing temperature and manufacturing processes when the positioning post 64 is positioned in the belt tensioning aperture 52 and the carriage drive belt 24 is thus operating under the desired belt tension.

Figure 2:
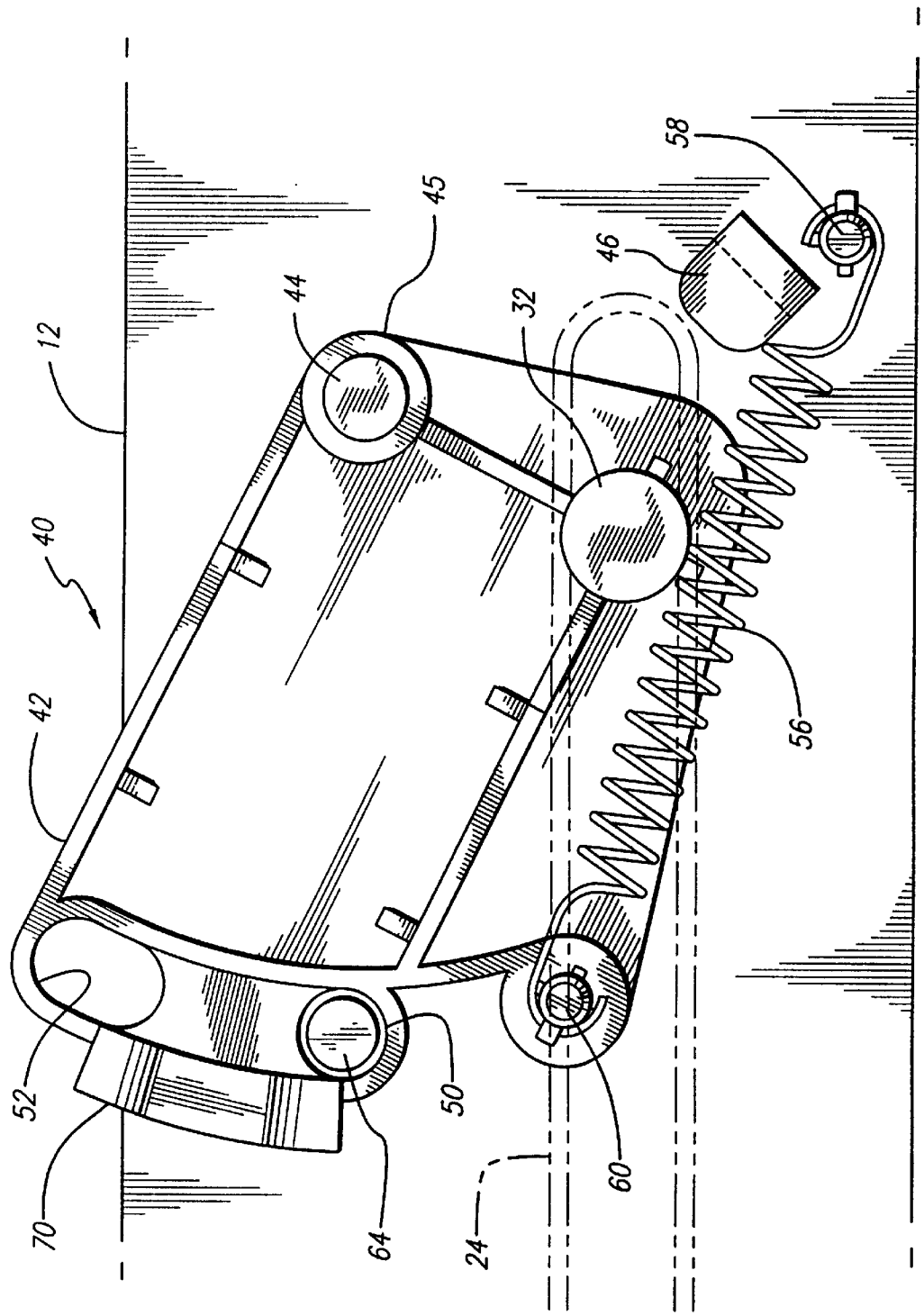
FIG. 2 is a plan view of the tensioner in a scanner belt installation position.
Figure 3:
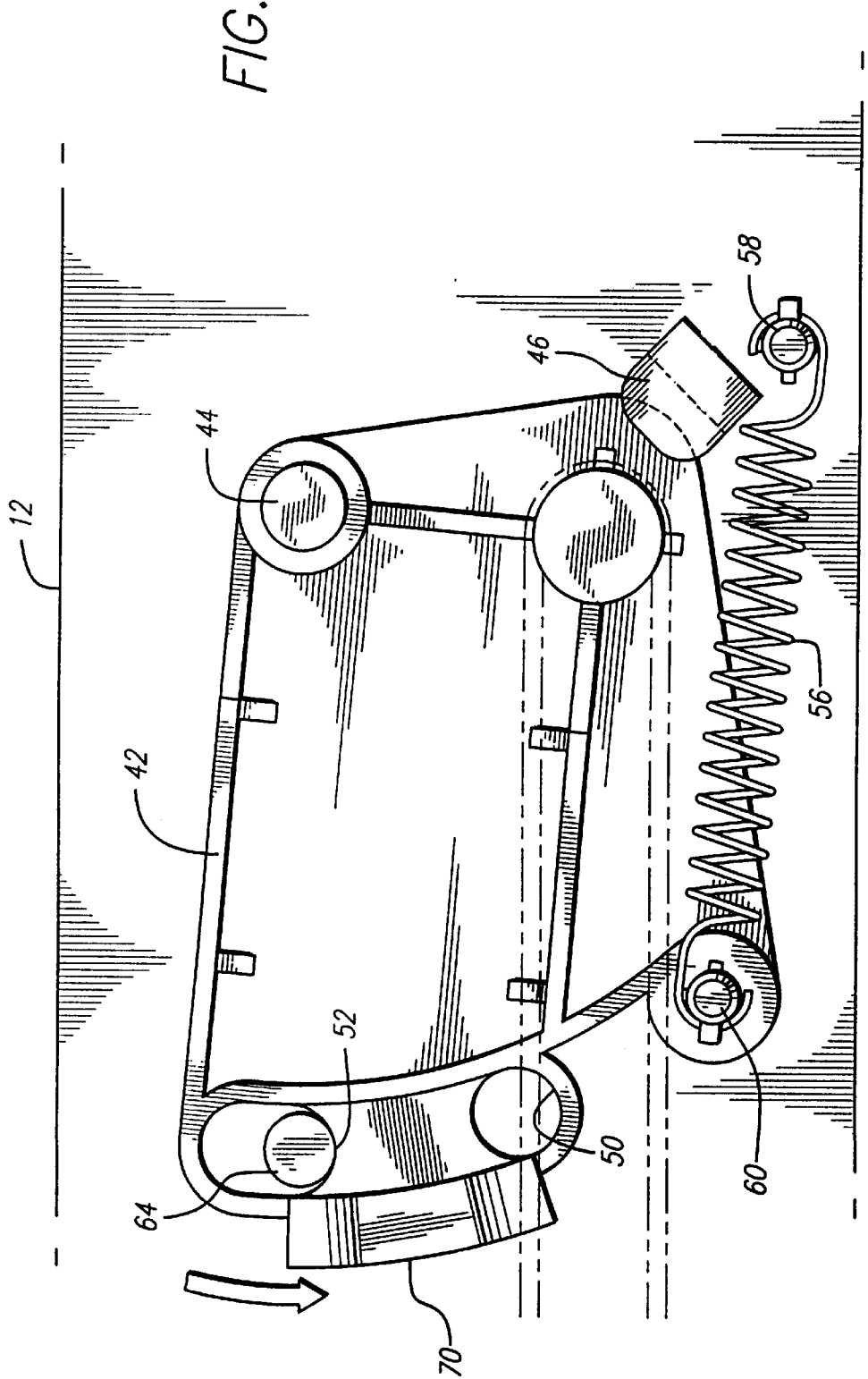
FIG. 3 is a plan view of the tensioner in a scanner belt tensioning position.
Figure 4:
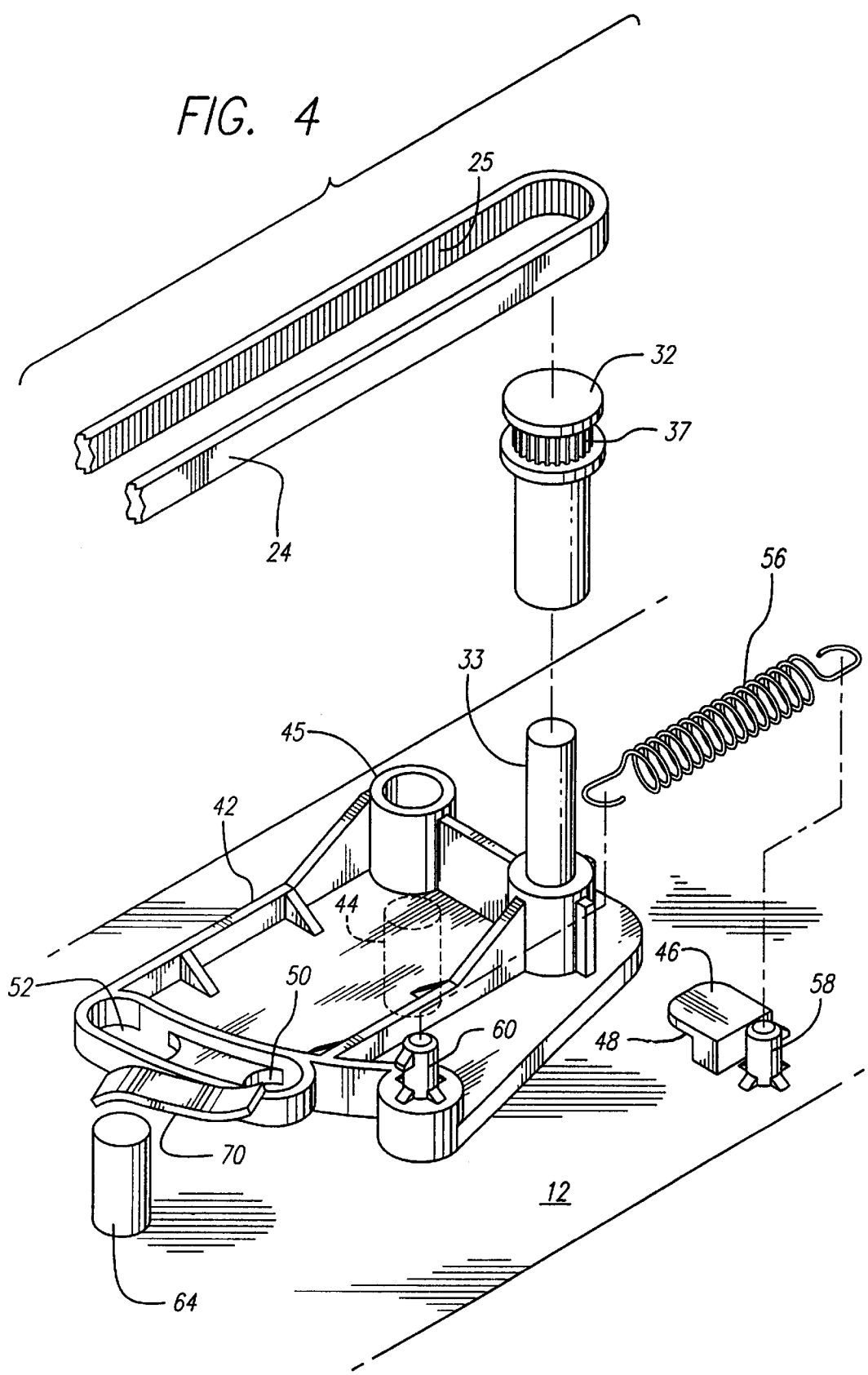
FIG. 4 is an exploded perspective view of the tensioner in a removal position.

The belt tensioner base 42 is axially slidable on the pivot shaft 44 by engaging a finger handle 70 positioned proximate the installation aperture 50 and the belt tensioning aperture 52 as shown in FIG. 2. The tensioner base 42 and pulley 32 may therefore be lifted away from the housing 12 to disengage the positioning post 64 from the apertures 50, 52 to position the base 42 in any of three positions comprising: the spring removal position where the spring 56 is under no spring tension; the belt installation position with the positioning post 64 in the belt installation aperture 50 as shown in FIG. 2 where the spring 56 is fully extended and thus under maximum tension so that the carriage drive belt 24 is free to slide on and off of the pulley 32; and the belt tensioning or operating position in FIG. 3 where the spring 56 is under intermediate tension to tension the belt 24 to the proper extent. A vertical motion limiting stop 46 formed on the scanner housing 12 as seen in FIG. 3 includes a stop surface 48 to prevent excessive axial motion of the tensioner base on shaft 44 by engagement of the top surface of the tensioner base with the lower surface 48 of the stop 46 as seen in FIG. 4. Excessive counterclockwise or clockwise movement of the tensioner base 42 about the shaft 44 is prevented by the engagement of positioning post 64 with the ends of the belt tensioning aperture 52.

The tensioner base 42 is a molded plastic part having thickened areas to provide adequate structural strength at the pivot bearing 45, spring post 58, apertures 50, 52 and handle 70. The pulley shaft 33 may also be integrally formed with the base 42 or, as shown, the pulley shaft may comprise a separate metal shaft firmly held in a structurally thickened posthole formed in the molded plastic base 42.

A simple and inexpensive scanner belt tensioner has been disclosed in which the user is able to easily position the belt tensioner as desired to remove or replace the spring 56 or to remove or replace the belt 24 or to apply the proper degree of tension to the belt 24, and to provide protection for the scanner from mechanical shock loads from user handling or shipping, all without the necessity of disconnection of any affixation or holding screws or other fasteners.

Persons skilled in the art will appreciate that various modifications can be made in the preferred embodiment shown and described above and that the scope of protection is limited only by the wording of the claims which follow.

What is claimed is:

1. In a document scanner which includes a housing and a belt driven moveable document scanning carriage in said housing, a belt tensioner comprising:

a) a tensioner base attached to said scanner housing for movement about a first pivot axis, said base being moveable in a plane substantially parallel to the direction of movement of said carriage;

b) a belt tensioner pulley mounted on said base for rotation about a second axis parallel to and spaced from said first axis, said pulley being engageable with a carriage drive belt; and c) a spring affixed to said base and to said housing for biasing said base in a direction to tension said belt; said base and said housing having first engageable means for retaining said base relative to said housing in a belt installation position and second engageable means for retaining and limiting movement of said base relative to said housing in a belt tensioning position, said base being moveable with respect to said housing along said first axis to disengage said first and second engageable means to permit pivotal movement of said base relative to said housing between said positions and to a spring removal position.

2. The scanner of claim 1, wherein said first engageable means comprises a belt installation aperture in said base and a post on said housing receivable in said installation aperture.

3. The scanner of claim 2, wherein said second engageable means comprises a belt tensioning aperture in said base, and said post on said housing being receivable in said tensioning aperture, said installation and tensioning apertures being located on an arc centered on said first axis and said tensioning aperture being elongated along said arc.

4. The scanner of claim 3, wherein said spring is a tension spring.

5. The scanner of claim 4, further comprising a first spring attachment post on said housing and a second spring attachment post on said base, said second attachment post being spaced from said first attachment post when said base is in said removal position a distance less than the untensioned length of said spring.

6. The scanner of claim 5, wherein said installation aperture is spaced in a direction along said arc a first distance from said attachment post on said base and said tensioning aperture is spaced in said direction along said arc a second distance from said attachment post on said base, said second distance being greater than said first distance.

7. The scanner of claim 6, wherein said base is mounted on a pivot shaft on said housing which extends into a bearing aperture in said base.

8. The scanner of claim 7, further comprising a handle on said base for axially moving said base relative to said pivot shaft.

9. The scanner of claim 8, wherein said handle is positioned on said base proximate said belt installation and tensioning apertures.

10. The scanner of claim 6, wherein said pulley is positioned at one end of the length of travel of said belt.

11. The scanner of claim 10, wherein said pulley and said belt have mating teeth thereon.

* * * * *